United States Patent
Kuo et al.

(10) Patent No.: US 8,912,749 B2
(45) Date of Patent: Dec. 16, 2014

(54) ELECTRICAL APPARATUS AND VERIFICATION METHOD FOR BATTERY MODULE THEREOF

(75) Inventors: Yung-Hsien Kuo, Taoyuan County (TW); Tai-Chuan Chen, Taoyuan County (TW); Chih-Hung Li, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 813 days.

(21) Appl. No.: 13/150,273

(22) Filed: Jun. 1, 2011

(65) Prior Publication Data

US 2012/0306505 A1 Dec. 6, 2012

(51) Int. Cl.
H02J 7/00 (2006.01)
G01N 27/416 (2006.01)

(52) U.S. Cl.
CPC ....... H02J 7/0006 (2013.01); *H02J 2007/0001* (2013.01); *H02J 2007/0098* (2013.01)
USPC .......................................... 320/106; 324/433

(58) Field of Classification Search
USPC .......................................... 320/106; 324/433
See application file for complete search history.

(56) References Cited

U.S. PATENT DOCUMENTS

| | | |
|---|---|---|
| 5,184,059 A | 2/1993 | Patino et al. |
| 5,200,686 A | 4/1993 | Lee |
| 5,237,257 A | 8/1993 | Johnson et al. |
| 5,608,306 A | 3/1997 | Rybeck et al. |
| 6,112,105 A | 8/2000 | Olsson |
| 6,522,100 B2 | 2/2003 | Hansford |
| 2003/0034757 A1* | 2/2003 | Woodnorth ................. 320/132 |
| 2007/0123303 A1 | 5/2007 | Book et al. |
| 2008/0238357 A1* | 10/2008 | Bourilkov et al. ............ 320/106 |
| 2008/0303486 A1 | 12/2008 | Kao et al. |
| 2010/0295503 A1* | 11/2010 | Bourilkov et al. ............ 320/106 |

FOREIGN PATENT DOCUMENTS

| | | |
|---|---|---|
| CN | 1214555 | 4/1999 |
| CN | 1134874 | 1/2004 |
| CN | 100355303 | 12/2007 |
| CN | 101322089 | 11/2010 |
| TW | 201004094 | 1/2010 |
| TW | 201021362 | 6/2010 |
| TW | 201108541 | 3/2011 |

OTHER PUBLICATIONS

"Search Report of Europe Counterpart Application", issued on May 9, 2012, p. 1-p. 8.
"Office Action of Taiwan Counterpart Application", issued on Sep. 9, 2013, p. 1-p. 5.
"First Office Action of China Counterpart Application", issued on Aug. 4, 2014, p. 1-p. 7.

* cited by examiner

*Primary Examiner* — M'Baye Diao
(74) *Attorney, Agent, or Firm* — Jianq Chyun IP Office

(57) ABSTRACT

An electrical apparatus including a battery module and a battery verification module is disclosed. The battery module has a verification circuit and an identification resistor. When the battery module is connected to the battery verification module, the battery verification module obtains a type information of the battery module according to the voltage level on a coupled point between a reference resistor and the identification resistor. The battery verification module transmits a verification request to the verification circuit to allow the verification circuit to transmit a verification signal to the battery verification module through a coupled path between the reference resistor and the identification resistor. The reference resistor is built in the battery verification module.

18 Claims, 4 Drawing Sheets

ELECTRICAL APPARATUS AND VERIFICATION METHOD FOR BATTERY MODULE THEREOF

BACKGROUND OF THE INVENTION

1. Field of the Invention

The disclosure relates to an electrical apparatus and a method for verifying a battery module thereof.

2. Description of Related Art

FIG. 1 is a diagram of a conventional electrical apparatus 100. Referring to FIG. 1, conventionally, a pull-down resistor RPL is disposed in the battery 110 that is connected to the electrical apparatus 100 for supplying power. The pull-down resistor RPL is serially connected between the terminal CN1 of the battery 110 and a ground voltage GND. A battery verification module 120 for perform battery verification in the electrical apparatus 100 includes a pull-up resistor RPU, a transistor M1, a resistor RSD1, and processors 121 and 122. The pull-up resistor RPU is connected to a voltage V1 and the gate of the transistor M1, the drain of the transistor M1 is coupled to a voltage V2 and the processor 121, and the source of the transistor M1 is coupled to the ground voltage GND. The resistor RSD1 is serially connected between the terminal DT and the processor 122. In addition, the battery verification module 120 is further connected to the terminal CN2.

When the battery 110 is connected to the terminal CN2 to which the battery verification module 120 is connected through the terminal CN1, the voltage on the terminal DT is equal to the voltage obtained by dividing the voltage V1 according to the resistances of the pull-up resistor RPU and the pull-down resistor RPL. Then, the processor 122 reads the voltage on the terminal DT to distinguish the label of the battery 110. In addition, when the battery 110 is effectively connected to the battery verification module 120, the voltage on the terminal DT drops and accordingly the transistor M1 is disabled. Thus, the processor 121 receives a voltage equal to the voltage V2 and accordingly determines that the battery 110 is already connected to the electrical apparatus 100.

In the conventional battery verification method described above, if a resistor having the same resistance as that of the pull-down resistor RPL in an original battery is disposed into a non-original battery, the battery verification module 120 will not be able to distinguish the non-original battery from an original battery. Accordingly, when the electrical apparatus 100 charges such a non-original battery, safety hazards may be produced due to overcharge.

SUMMARY OF THE INVENTION

Accordingly, the disclosure is directed to an electrical apparatus, in which a battery module is verified to prevent any unverified battery module from damaging the electrical apparatus.

The disclosure is directed to a method for verifying a battery module of an electrical apparatus so as to prevent any unverified battery module from damaging the electrical apparatus.

The disclosure provides an electrical apparatus including a battery module and a battery verification module. The battery module has a verification circuit and an identification resistor. The identification resistor is coupled to a first reference voltage. The battery verification module has a reference resistor coupled to a second reference voltage. When the battery module is connected to the battery verification module, the reference resistor and the identification resistor are serially connected between the first reference voltage and the second reference voltage. The battery verification module obtains a type information of the battery module according to a voltage level on a coupled point between the reference resistor and the identification resistor. The battery verification module transmits a verification request to the verification circuit to allow the verification circuit to transmit a verification signal to the battery verification module through a coupled path between the reference resistor and the identification resistor.

The disclosure provides a method for verifying a battery module of an electrical apparatus, wherein the electrical apparatus has a battery verification module. The method includes following steps. A voltage level on a coupled terminal of the battery verification module and the battery module is read, and a type information of the battery module is obtained according to the voltage level. A verification request is transmitted to the verification circuit by using the battery verification module, so as to allow the verification circuit to transmit a verification signal to the battery verification module according to the verification request through the coupled terminal of the battery verification module and the battery module.

As described above, in the disclosure, the type information of a battery module connected to an electrical apparatus is obtained according to the voltage level on the coupled terminal of a battery verification module and the battery module. Besides, in the disclosure, a verification signal transmitted by a verification circuit in a battery verification module is received by using the battery verification module built in the electrical apparatus. Thereby, the type information (at least one of the specification, the model, and the label) of the battery module connected to the electrical apparatus can be effectively obtained, and any damage caused by unverified battery module on the electrical apparatus may be effectively avoided.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
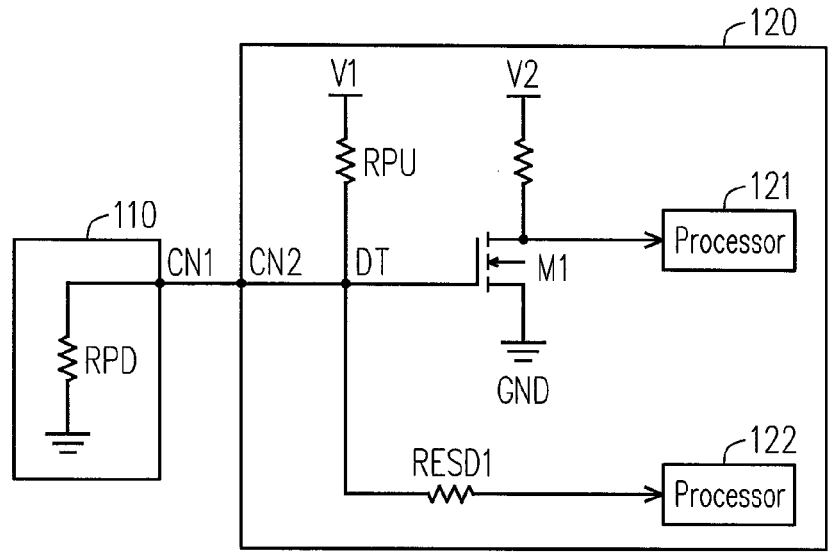
FIG. 1 is a diagram of a conventional electrical apparatus 100.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
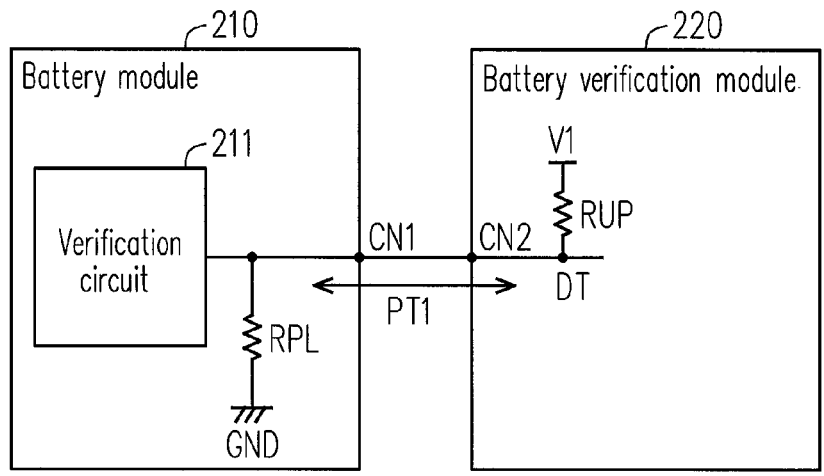
FIG. 2 is a diagram of an electrical apparatus 200 according to an embodiment of the disclosure.

FIG. 2 is a diagram of an electrical apparatus 200 according to an embodiment of the disclosure. Referring to FIG. 2, the electrical apparatus 200 includes a battery module 210 and a battery verification module 220. The battery module 210 has a verification circuit 211 and an identification resistor RPL. One end of the identification resistor RPL is coupled to a reference voltage GND, and the other end of the identification resistor RPL is coupled to the verification circuit 211. The battery verification module 220 has a reference resistor RUP coupled to a reference voltage V1. The battery module 210 and the battery verification module 220 respectively have a terminal CN1 and a terminal CN2.

When the battery module 210 is connected to the battery verification module 220, the reference resistor RUP and the identification resistor RPL are serially connected between the reference voltages V1 and GND. Namely, the voltage on the coupled terminal DT between the reference resistor RUP and the identification resistor RPL is equal to the voltage obtained by dividing the reference voltage V1 according to the resistances of the reference resistor RUP and the identification resistor RPL.

In the present embodiment, the battery verification module 220 obtains a type information of the battery module 210 according to the voltage on the terminal DT. Herein the type information includes at least one of the label, the model, and the specification of the battery module 210. To be specific, battery modules 210 having different type information have different built-in identification resistors RPL. Thus, when a battery module 210 having different type information is connected to the battery verification module 220, the voltage level on the terminal DT is different. Accordingly, the battery verification module 220 may obtain the type information of the battery module 210 according to the voltage level on the terminal DT.

Additionally, it should be noted that after the battery verification module 220 is connected with the battery module 210, the battery verification module 220 transmits a verification request to the verification circuit 211 in the battery module 210. Accordingly, the verification circuit 211 transmits a verification signal to the battery verification module 220 through a coupled path PT1 between the reference resistor RUP and the identification resistor RPL. It should be mentioned that the battery verification module 220 transmits the verification request to the verification circuit 211 in the battery module 210 through the same coupled path PT1.

The verification circuit 211 is a circuit that may transmit digital or analog verification signal to the terminal CN1. Namely, the verification circuit 211 generates the verification signal by using a serially connected resistor string, an encoding integrated circuit (IC), or a capacitor network. For example, the verification circuit 211 serially connects a resistor string between two different voltage levels and generates the verification signal by using the voltage division produced by the resistor string. Or, the verification circuit 211 provides an encoded digital data generated by an encoding IC as the verification signal. The verification circuit 211 may also generate the verification signal through voltage division or voltage multiplication by using a capacitor network.

Since the terminals CN2 and CN1 of the battery verification module 220 and the battery module 210 are both one-wire terminals, signal transmission between the battery verification module 220 and the battery module 210 may be carried out according to a one-wire protocol.

One-wire protocol refers to a protocol in which data is transmitted between two electrical apparatuses by using a single wire. In short, based on the one-wire protocol, the wire used for transmitting data is pulled to a high voltage level. When one electrical apparatus (for example, an apparatus A) is about to transmit data to the other electrical apparatus (for example, an apparatus B), the apparatus A notifies the apparatus B that data is to be transmitted by pulling the voltage on the wire to a low level for a time period. After the apparatus B confirms the data transmission operation to be carried out by the apparatus A, the apparatus A transmits different data (logic 0 or logic 1) by pulling low the voltage level on the wire for different time periods.

Figure 3:
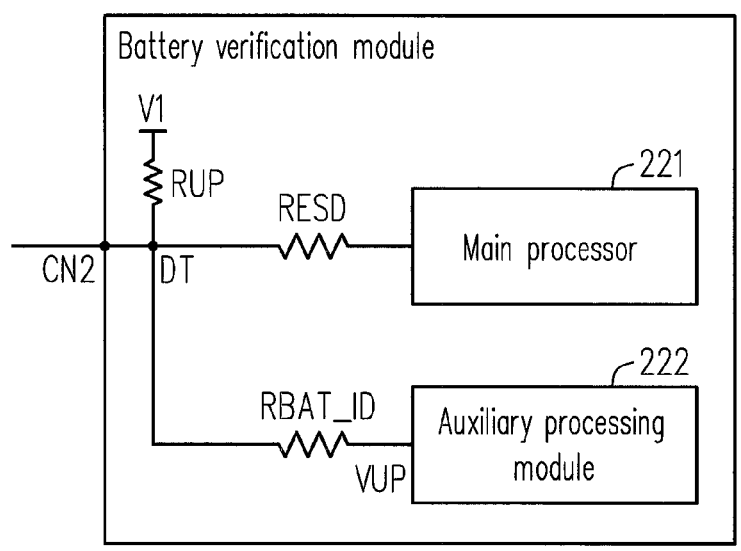
FIG. 3 illustrates an implementation of a battery verification module 220 according to an embodiment of the disclosure.

FIG. 3 illustrates an implementation of the battery verification module 220 according to an embodiment of the disclosure. Referring to FIG. 3, besides the reference resistor RUP, the battery verification module 220 further includes a main processor 221, an auxiliary processing module 222, and a voltage dividing resistor RBAT_ID. The main processor 221 is coupled to the terminal DT of the reference resistor RUP that is not coupled to the reference voltage V1. The auxiliary processing module 222 is coupled to the main processor 221. The voltage dividing resistor RBAT_ID is coupled on the coupled path between the auxiliary processing module 222 and the main processor 221. The resistance of the voltage dividing resistor RBAT_ID is smaller than the resistance of the reference resistor RUP. The main processor 221 is coupled to the terminal DT through a pin of a general purpose input output (GPIO) port thereof and transmits and receives data through the pin of the GPIO port connected to the terminal DT.

Below, the verification of the battery module 210 of the electrical apparatus 200 will be described in detail according to the present embodiment with reference to FIG. 2 and FIG. 3. First, when the battery module 210 is connected to the electrical apparatus 200, the auxiliary processing module 222 obtains the type information of the battery module 210 according to the voltage on the terminal DT. Herein the auxiliary processing module 222 may be an analog-to-digital converter (ADC), and which converts the voltage on the terminal DT from an analog format into a digital format, so that the battery module 210 may obtain the type information of the battery module 210 according to the voltage on the terminal DT in the digital format.

Then, the auxiliary processing module 222 supplies a pull-up voltage VUP to one end of the voltage dividing resistor RBAT_ID (the other end of the voltage dividing resistor RBAT_ID is coupled to the terminal DT). Besides, after the pull-up voltage VUP supplies by the auxiliary processing module 222 stabilizes, the main processor 221 sends a low-level voltage to the terminal DT to pull the voltage level on the terminal DT from the pull-up voltage VUP down to a lower voltage level (for example, the ground voltage). Meanwhile, the verification circuit 211 of the battery module 210 detects that the voltage on the terminal DT is pulled low and accordingly obtains the verification request issued by the battery verification module 220.

It should be mentioned that in the present embodiment, the resistance of the reference resistor RUP is much greater than that of the voltage dividing resistor RBAT_ID. When the auxiliary processing module 222 supplies the pull-up voltage VUP to one end of the voltage dividing resistor RBAT_ID, the voltage on the terminal DT is nearly determined by the pull-up voltage VUP. Namely, herein the voltage on the terminal DT is about equal to the pull-up voltage VUP. On the other hand, after the voltage on the terminal DT stabilizes, the main processor 221 supplies a low-level voltage to the terminal DT to pull the voltage on the terminal DT down to the low-level voltage.

Additionally, a resistor RESD is serially connected between the main processor 221 and the terminal DT for electrostatic discharge (ESD) protection.

After the verification circuit 211 of the battery module 210 obtains the verification request issued by the battery verification module 220, the main processor 221 sets the terminal thereof coupled to the reference resistor RUP as an input terminal, and the verification circuit 211 supplies the low-level voltage to the terminal DT and sequentially transmits verification signal by pulling down the voltage on the terminal DT. Herein the main processor 221 may be coupled to the terminal DT through a pin of the GPIO port thereof and sends a voltage to the terminal DT or receive the voltage on the terminal DT through the pin.

After the verification request is completed, the auxiliary processing module 222 obtains a voltage variation curve of the battery module 210 by monitoring the voltage variation on the terminal DT.

It should be mentioned that the operations of the auxiliary processing module 222 for supplying the pull-up voltage VUP and receiving the voltage on the terminal DT may be carried out through a pin of a GPIO port of the main processor 221. In other words, the auxiliary processing module 222 may be built in the main processor 221.

Figure 4A:
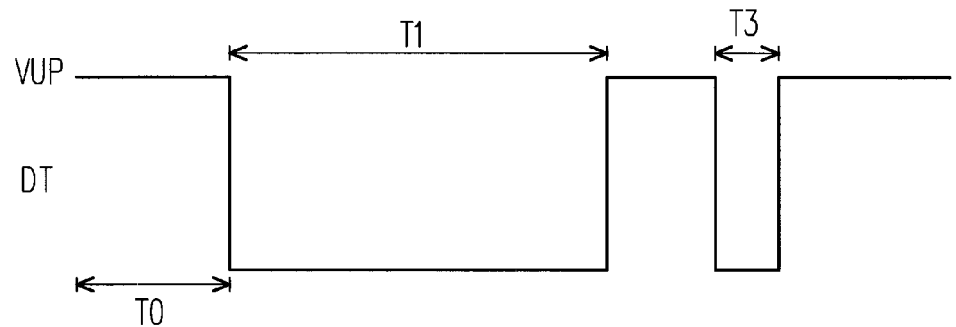
FIG. 4A and FIG. 4B respectively illustrate waveforms of signals transmitted between a battery verification module and a battery module.
Figure 4B:
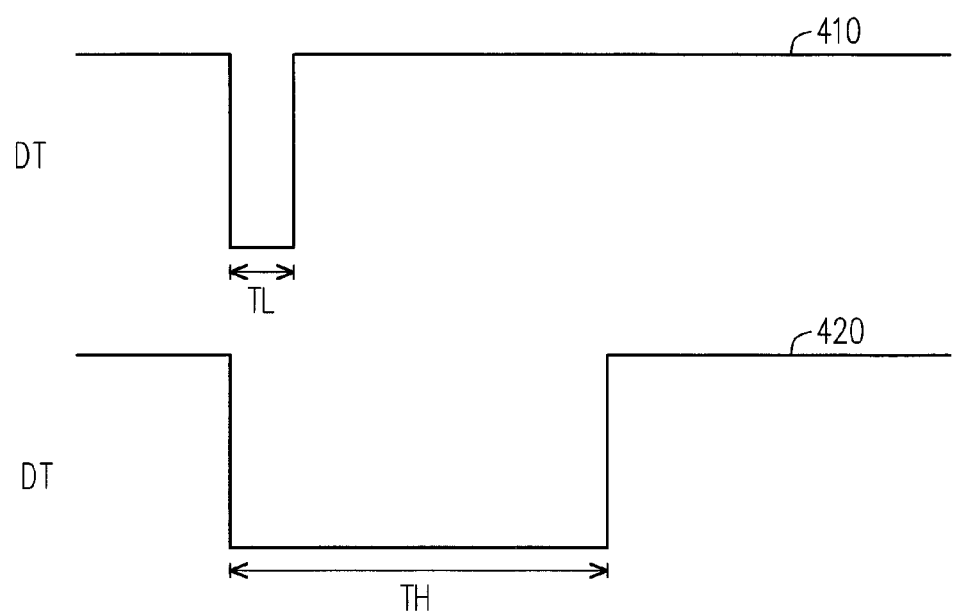

FIG. 4A and FIG. 4B respectively illustrate waveforms of signals transmitted between a battery verification module and a battery module. Referring to FIG. 4A and FIG. 4B, data transmission between the battery verification module and the battery module is carried through based on a one-wire protocol. As shown in FIG. 4A, during the time period T0, the auxiliary processing module supplies a pull-up voltage VUP and maintains the voltage level on the terminal DT at approximately the level of the pull-up voltage VUP. During the time period T1, the main processor supplies a low-level voltage to continuously pull down the voltage level on the terminal DT. During the time period T3, because the battery module receives the verification request and determines that the verification request is already activated during the time period T1, the battery module pulls down the voltage on the terminal DT to transmit an acknowledgement signal to the battery verification module.

It should be noted herein that during the time periods T1 and T2, the terminal of the main processor coupled to the terminal DT is set as an input terminal for receiving a voltage variation on the terminal DT produced by the battery module, so that the main processor may receive the verification signal issued by the verification circuit and verify the battery module according to the verification signal.

As shown in FIG. 4B, the verification circuit may transmit the logic verification signal by pulling down the voltage on the terminal DT for different time periods. Taking the waveform 410 as an example, the verification circuit pulls down the voltage on the terminal DT for a time period TL to transmit a logic signal "1". Moreover, taking the waveform 420 as an example, the verification circuit pulls down the voltage on the terminal DT for a time period TH to transmit a logic signal "0", wherein the time period TH is longer than the time period TL.

However, the correspondence between the logic signal "1" or "0" and the time period of pulling down the voltage on the terminal DT is not limited in the disclosure and may be changed.

Figure 5:
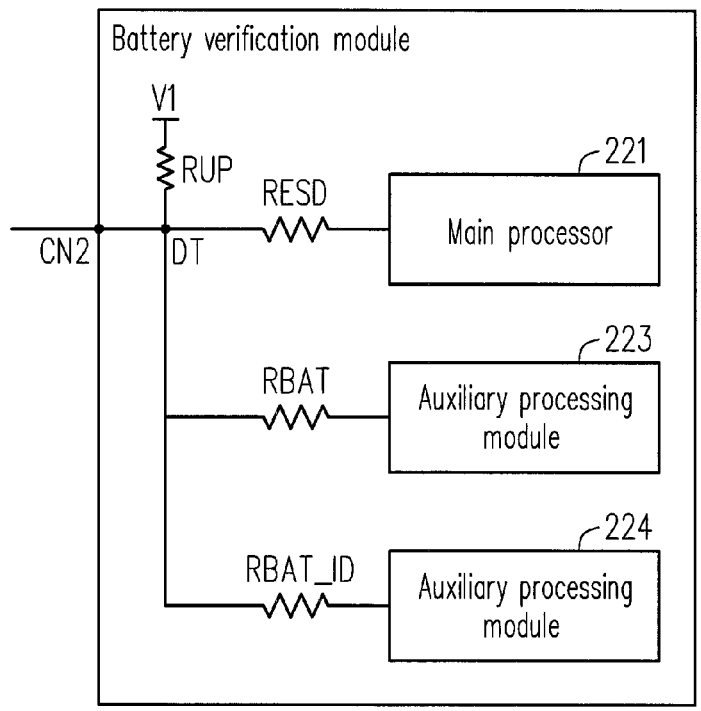
FIG. 5 illustrates another implementation of the battery verification module 220 according to an embodiment of the disclosure.

FIG. 5 illustrates another implementation of the battery verification module 220 according to an embodiment of the disclosure. Referring to FIG. 5, the battery verification module 220 includes a main processor 221, auxiliary processing modules 223 and 224, voltage dividing resistors RBAT and RBAT_ID, and a resistor RESD. Unlike the implementation illustrated in FIG. 3, in this implementation, the battery verification module 220 includes two auxiliary processing modules 223 and 224. One of the auxiliary processing modules 223 and 224 supplies a pull-up voltage when the verification request is performed, and the other one of the auxiliary processing modules 223 and 224 is an ADC for detecting the voltage on the terminal DT before the verification request is performed.

In addition, the auxiliary processing module 223 or 224 served as the ADC may also obtain a voltage variation curve of the battery module 210 by monitoring the voltage variation on the terminal DT after the verification request is completed.

Figure 6:
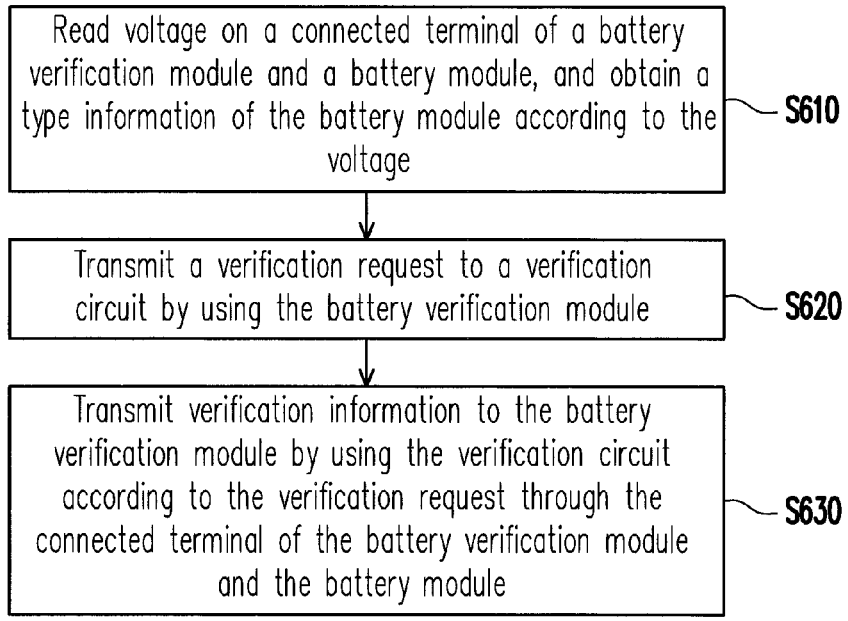
FIG. 6 is a flowchart of a method for verifying a battery module connected to an electrical apparatus according to an embodiment of the disclosure.

FIG. 6 is a flowchart of a method for verifying a battery module of an electrical apparatus according to an embodiment of the disclosure. Referring to FIG. 6, the electrical apparatus has a battery verification module. The verification method in the present embodiment includes following steps. First, a voltage level on a coupled terminal of the battery verification module and the battery module is read, and a type information of the battery module is obtained according to the voltage level (S610). Then, a verification request is transmitted by the battery verification module to the verification circuit (S620). Finally, a verification signal is transmitted by the verification circuit to the battery verification module according to the verification request through the coupled terminal of the battery verification module and the battery module (S630). Namely, the verification signal is transmitted to the battery verification module based on a one-wire protocol.

The method for verifying a battery module of an electrical apparatus provided by the disclosure has been described in detail in foregoing embodiments and implementations therefore will not be described herein.

In summary, according to the disclosure, the type information of a battery module is obtained according to the voltage on the coupled terminal of a battery verification module and the battery module, and a verification signal is transmitted to the battery verification module by the battery module, so that the battery module may be effectively verified by the battery verification module. Accordingly, an original battery module conforming to the manufacturer's specification may pass the verification, while any non-original battery module may be detected. Thus, any damage caused by non-original battery on an electrical apparatus may be effectively avoided.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electrical apparatus, comprising:
    a battery module, having a verification circuit and an identification resistor, wherein the identification resistor is coupled to a first reference voltage; and
    a battery verification module, having a reference resistor coupled to a second reference voltage and further comprising:
    a main processor, coupled to an end of the reference resistor that is not coupled to the second reference voltage;
    a first auxiliary processing module, coupled to the main processor; and a first voltage dividing resistor, coupled on a coupled path between the first auxiliary processing module and the main processor, wherein a resistance of the first voltage dividing resistor is smaller than a resistance of the reference resistor, wherein when the battery module is connected to the battery verification module, the reference resistor and the identification resistor are serially connected between the first reference voltage and the second reference voltage, the battery verification module obtains a type information of the battery module according to a voltage on a coupled point between the reference resistor and the identification resistor, the battery verification module transmits a verification request to the verification circuit to allow the verification circuit to transmit a verification signal to the battery verification module through a coupled path between the reference resistor and the identification resistor.

2. The electrical apparatus according to claim 1, wherein the verification circuit transmits the verification signal to the battery verification module according to a one-wire protocol.

3. The electrical apparatus according to claim 1, wherein in the battery module, one end of the identification resistor is coupled to the first reference voltage, and another end of the identification resistor is coupled to the verification circuit.

4. The electrical apparatus according to claim 1, wherein the first auxiliary processing module obtains the type information of the battery module by reading the voltage on the coupled point between the reference resistor and the identification resistor.

5. The electrical apparatus according to claim 4, wherein the first auxiliary processing module comprises:
an analog-to-digital converter (ADC), receiving and converting the voltage on the coupled point between the reference resistor and the identification resistor from an analog format into a digital format, and obtaining the type information according to the voltage on the coupled point between the reference resistor and the identification resistor in the digital format.

6. The electrical apparatus according to claim 1, wherein the first auxiliary processing module supplies a pull-up voltage to the first voltage dividing resistor, and the main processor transmits a low-level voltage to the coupled point between the reference resistor and the identification resistor to activate the verification request.

7. The electrical apparatus according to claim 6, wherein the low-level voltage is lower than the pull-up voltage.

8. The electrical apparatus according to claim 1, wherein after the verification request is completed, the first auxiliary processing module reads and records a voltage variation on the coupled point between the reference resistor and the identification resistor, and a terminal of the main processor coupled to the reference resistor is set as an input terminal.

9. The electrical apparatus according to claim 1, wherein the first auxiliary processing module is built in the main processor and is coupled to the first voltage dividing resistor through a pin of a general purpose input output (GPIO) port of the main processor.

10. The electrical apparatus according to claim 1, further comprising:
a second auxiliary processing module; and
a second voltage dividing resistor, wherein one end of the second voltage dividing resistor is coupled to the end of the reference resistor that is not coupled to the second reference voltage, and another end of the second voltage dividing resistor is coupled to the second auxiliary processing module.

11. The electrical apparatus according to claim 10, wherein the first auxiliary processing module obtains the type information of the battery module by reading the voltage on the coupled point between the reference resistor and the identification resistor.

12. The electrical apparatus according to claim 11, wherein the first auxiliary processing module is an ADC, the first auxiliary processing module receives and converts the voltage on the coupled point between the reference resistor and the identification resistor from an analog format into a digital format and obtains the type information according to the voltage on the coupled point between the reference resistor and the identification resistor in the digital format.

13. The electrical apparatus according to claim 10, wherein when the battery verification module transmits the verification request to the verification circuit, the second auxiliary processing module supplies a pull-up voltage to the second voltage dividing resistor, and the main processor transmits a low-level voltage to the coupled point between the reference resistor and the identification resistor to activate the verification request.

14. The electrical apparatus according to claim 13, wherein the low-level voltage is lower than the pull-up voltage.

15. The electrical apparatus according to claim 10, wherein the first auxiliary processing module is built in the main processor and is coupled to the first voltage dividing resistor through a pin of a GPIO port of the main processor.

16. A method for verifying a battery module of an electrical apparatus, wherein the electrical apparatus has a battery verification module, the method comprising:
reading a voltage on a coupled terminal of the battery verification module and the battery module, and obtaining a type information of the battery module according to the voltage level;
transmitting a verification request to the verification circuit by using the battery verification module;
transmitting a verification signal to the battery verification module according to the verification request through the coupled terminal of the battery verification module and the battery module by using the verification circuit
supplying a pull-up voltage to the coupled terminal of the battery verification module and the battery module by using an auxiliary processing module of the battery verification module; and
transmitting a low-level voltage to a coupled point between a reference resistor and an identification resistor by using a main processor of the battery verification module, so as to activate the verification request,
wherein the low-level voltage is lower than the pull-up voltage.

17. The battery module verification method according to claim 16, wherein the verification circuit transmits the verification signal to the battery verification module according to a one-wire protocol.

18. The battery module verification method according to claim 16 further comprising:
after the verification request is completed, reading and recording a voltage variation on the coupled terminal of the battery verification module and the battery module by using the auxiliary processing module.

* * * * *